(12) United States Patent
Boche et al.

(10) Patent No.: US 7,032,747 B2
(45) Date of Patent: Apr. 25, 2006

(54) REUSABLE PACKAGING SYSTEM

(75) Inventors: Jurgen Hans Boche, Muscatine, IA (US); Michael J. Birkinbine, Blue Grass, IA (US)

(73) Assignee: HNI Technologies Inc., Muscatine, IA (US)

( * ) Notice: Subject to any disclaimer, the term of this patent is extended or adjusted under 35 U.S.C. 154(b) by 414 days.

(21) Appl. No.: 10/307,742

(22) Filed: Dec. 2, 2002

(65) Prior Publication Data
US 2004/0104143 A1    Jun. 3, 2004

(51) Int. Cl.
*B65D 85/00* (2006.01)
*B65D 1/34* (2006.01)

(52) U.S. Cl. .......................... 206/326; 206/564

(58) Field of Classification Search ............... 206/503, 206/562, 563, 564, 565, 557, 386, 597, 587, 206/594, 326, 320, 591, 592, 593, 499, 422; 217/26.5, 27
See application file for complete search history.

(56) References Cited

U.S. PATENT DOCUMENTS

| | | | |
|---|---|---|---|
| 758,239 A | 4/1904 | Ducart | |
| 819,259 A | 5/1906 | White | |
| 3,338,501 A * | 8/1967 | Clay | 206/521 |
| D216,868 S | 3/1970 | Britt | |
| 3,608,706 A * | 9/1971 | Vigue | 206/422 |
| 3,715,071 A * | 2/1973 | Flynn | 206/521.1 |
| 3,910,411 A | 10/1975 | Deeren | |
| 4,088,225 A | 5/1978 | Hartnell | |
| 4,170,297 A | 10/1979 | Johnson | |
| 4,355,731 A * | 10/1982 | Carroll et al. | 217/26.5 |
| 4,744,464 A * | 5/1988 | Noe | 206/422 |
| 4,936,450 A * | 6/1990 | Paul | 206/386 |
| 4,998,619 A * | 3/1991 | Sowa et al. | 206/392 |
| 5,292,001 A * | 3/1994 | Langenbeck et al. | 206/518 |
| 5,335,770 A * | 8/1994 | Baker et al. | 206/433 |
| 6,056,121 A | 5/2000 | Olson | |
| 6,530,476 B1 * | 3/2003 | Overholt | 206/386 |
| 6,804,938 B1 * | 10/2004 | Levin et al. | 53/449 |

* cited by examiner

*Primary Examiner*—Faye Francis
(74) *Attorney, Agent, or Firm*—Faegre & Benson LLP

(57) ABSTRACT

A reusable packaging system is disclosed in which a series of thermoformed trays are used to mount six spider type office chair bases. Three bases are mounted in an inverted position on the tray and three bases are mounted upright. A stack of load trays may be constructed with the bottom-most tray fastened to a standard pallet. The stack is plastic wrapped and shipped. After unloading, empty trays may be stacked in a nested arrangement and returned for reuse making for a simple, reliable and inexpensive system.

3 Claims, 5 Drawing Sheets

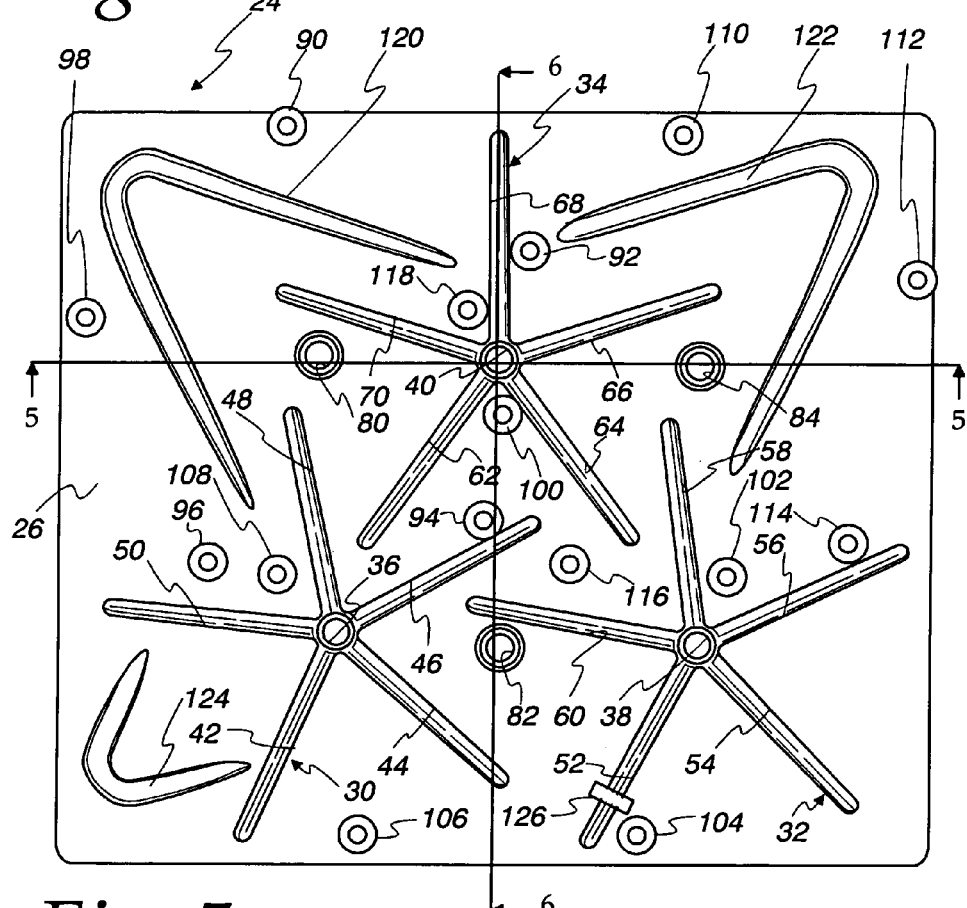
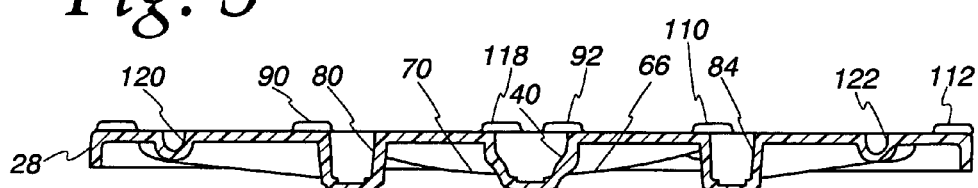
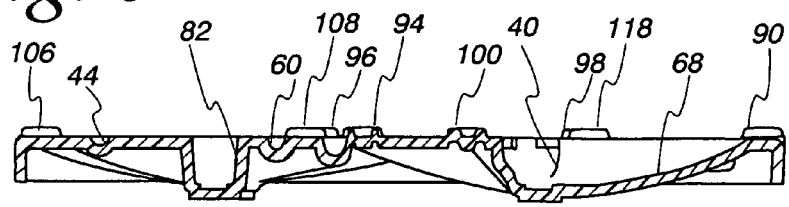

REUSABLE PACKAGING SYSTEM

BACKGROUND OF THE INVENTION

1. Field of the Invention

The present invention relates to a reusable packaging system and more particularly to a reusable packaging system for spider-type chair bases with each base having a hub and five spokes where the system includes support trays having about the same length and width as a standard pallet.

2. Description of the Related Art

Packaging systems have been in existence for many years including packaging systems for handling multiple items bundled together. See for example U.S. Pat. Nos. 758,239; 819,259; 3,910,411; 4,088,225; 4,170,297; and 6,056,121.

Packaging frequently concerns itself with enclosing an item or items to be transported in the smallest volume consistent with item protection. Another consideration is the ability to stack packaged items on a standard pallet so that the packaged items can be easily moved by a forklift truck. By standard pallet, it is meant a pallet having length and width dimensions of about 42 inches by about 48 inches.

Spider-type chair bases are particularly difficult to efficiently package because of their awkward shape.

BRIEF SUMMARY OF THE INVENTION

Difficulties previously encountered have been overcome by the present invention. What is described here is a reusable packaging system for multiple items of similar shape comprising a plurality of trays, each tray having a central panel, a peripheral skirt and a top surface with a plurality of recesses for receiving a first plurality of items in a first position and a plurality of mounds for receiving a second plurality of items in a second position, the second position being opposite to that of the first position. The trays are stacked upon one another in the same orientation with a plurality of items being sandwiched between trays so as to alternate with the trays when the reusable packaging system is used to transport the items and the trays are nestable with one another when the trays are not being used to transport items.

There are a number of advantages, features and objects achieved with the present invention which are believed not to be available in earlier related devices. For example, one advantage is that the present invention provides a packaging system that is especially suited for the efficient transport of six spider-type chair bases per support tray within the dimensional perimeters of a standard pallet where as many as seven or eight trays may be bundled together. Another object of the present invention is to provide an efficient packaging system that allows empty trays to be nested and returned for reuse. A further advantage of the present invention is that the packaging system is relatively inexpensive, easy to use and very efficient.

A more complete understanding of the present invention and other objects, advantages and features thereof will be gained from a consideration of the following description of a preferred embodiment read in conjunction with the accompanying drawing provided herein. The preferred embodiment represents an example of the invention which is described here in compliance with Title 35 U.S.C. section 112 (first paragraph), but the invention itself is defined by the attached claims.

BRIEF DESCRIPTION OF THE SEVERAL VIEWS OF THE DRAWING

FIG. 4 is a top plan view of the tray illustrated in FIG. 3.

FIG. 5 is a partial sectional view taken along line 5—5 of FIG. 4.

FIG. 6 is a partial sectional view taken along line 6—6 of FIG. 4.

DETAILED DESCRIPTION OF A PREFERRED EMBODIMENT OF THE INVENTION

Figure 1:
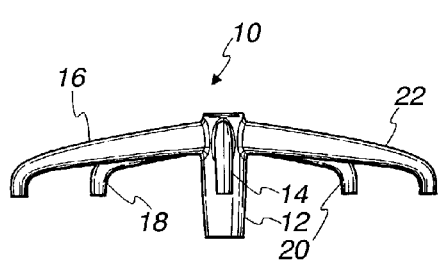
FIG. 1 is an elevation view of a spider-type chair base.

While the present invention is open to various modifications and alternative constructions, the preferred embodiment shown in the various figures of the drawing will be described herein in detail. It is understood, however, that there is no intention to limit the invention to the particular embodiment, form or example disclosed. On the contrary, the intention is to cover all modifications, equivalent structures and methods, and alternative constructions falling within the spirit and scope of the invention as expressed in the appended claims, pursuant to Title 35 U.S.C. section 112 (second paragraph).

Figure 2:
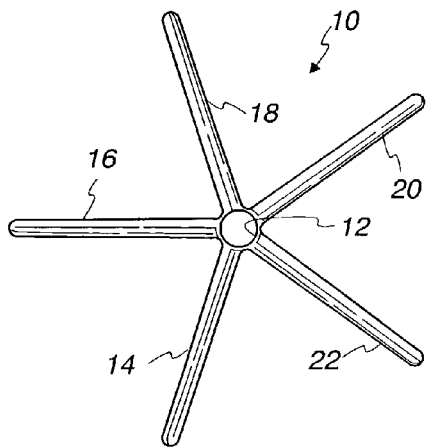
FIG. 2 is a top plan view of the chair base illustrated in FIG. 1.
Figure 3:
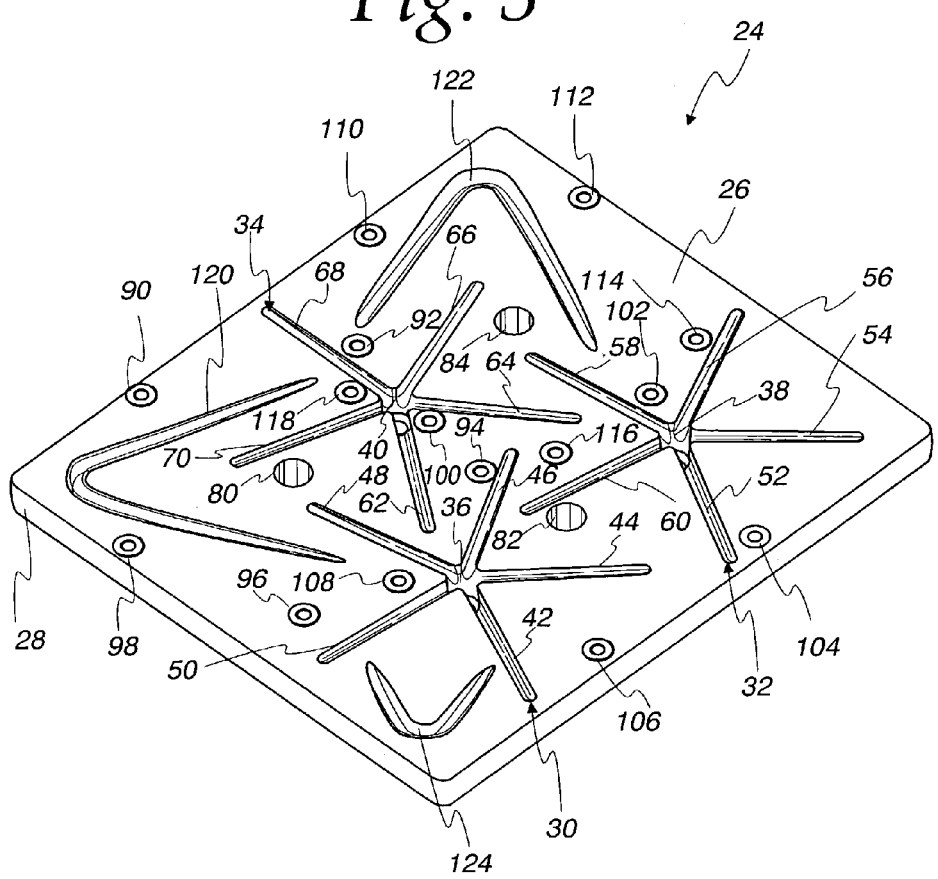
FIG. 3 is an isometric view of a support tray.
Figure 7:
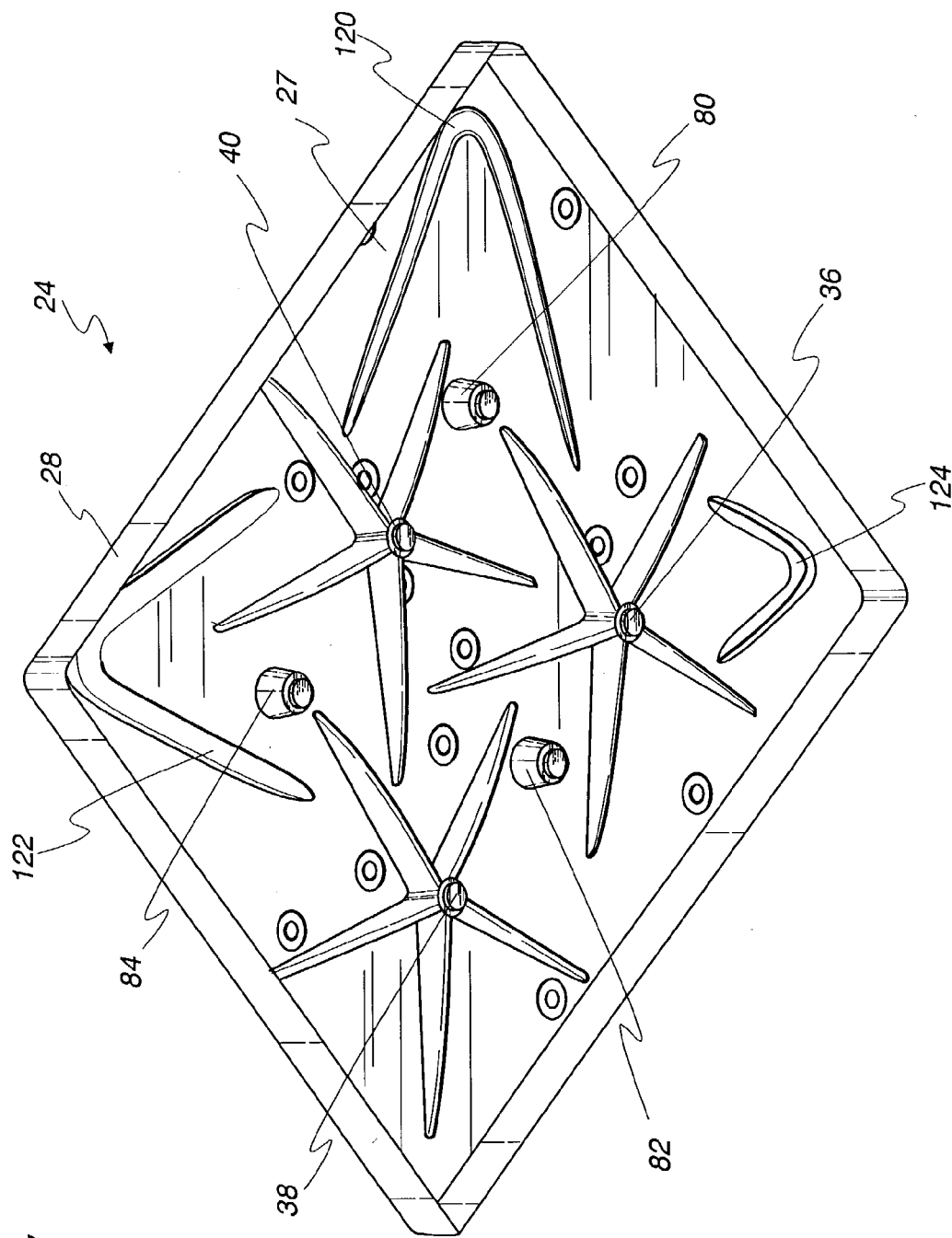
FIG. 7 is an upward looking isometric view of the tray illustrated in FIGS. 3–6.

As an introduction to what is disclosed here, reference is made to FIGS. 1 and 2 which illustrate a spider-type chair base 10. The chair base includes a central cylindrical hub 12 and five arms or spokes 14, 16, 18, 20, 22. a caster (not shown is attached at the extended end of each spoke. In turn, the chair base forms the lower portion of an office or work chair, such as that disclosed co-pending application Ser. No. 10/077,409, assigned to the assignee of the present application.

Chair bases may be manufactured or finished at a location distant from an assembly location where a chair base is mated with an upper portion of a chair. Generally the chair bases are cast in a casting shop at a distance from the chair assembly location. The chair bases may then be shipped to a polishing location and from there to the assembly location or to a paint location. From the paint location, the chair bases are shipped to the assembly location for chair completion. During each shipment, it is desirable that the chair bases be handled so as not to mar the surface finish of the bases.

To accomplish transportation of chair bases efficiently and economically, a system has been developed which includes the use of support structures, such as thermoformed trays. One such tray 24 is illustrated in detail in FIGS. 2–7. Each tray includes a central panel 25 with a top surface 26, a bottom surface 27 and a depending peripheral skirt 28. Formed in the top surface 26 are arrays of receiving structures, such as a plurality of recesses and a plurality of mounds. It is apparent that some of the recesses in plan view have the configuration of a chair base, namely, a central recess and five radiating recesses. There are three such arrays, such as five pointed "star" recesses 30, 32, 34, in a generally triangular relationship with each other. Each of the star recesses include a central, cup-like, cylindrical recess 36, 38, 40. Radiating from the central recess 36 of the star recess 30 are five elongated spoke recesses 42, 44, 46, 48, 50. Radiating from the central recess 38 of the star recess 32 are five spoke recesses 52, 54, 56, 58, 60. Extending from the central recess 40 of the star recess 34 are five spoke recesses 62, 64, 66, 68, 70. The triangular relationship may be visualized in FIG. 4 when a line is imagined between the recesses 36 and 38, another line imagined between the recesses 38 and 40, and a third line imagined between the recesses 36 and 40. It should also be noted that as shown in FIG. 4 the star recesses 30 and 32 are generally aligned rotationally, but that the star recess 34 is not aligned. The star recess 34 is disposed rotationally slightly more in a clockwise direction than the star recesses 30 and 32.

The top surface 26 also includes three cup-like recesses 80, 82, 84. Each of the cup-like recesses are related to five generally circular mounds forming an array of receiving structures. For example, the cup-like recess 80 is related to a first group of five circular mounds 90, 92, 94, 96, 98. The cup-like recess 82 is related to a second group of five mounds 100, 102, 104, 106, 108. The third cup-like recess 84 is related to a third set of five mounds 110, 112, 114, 116, 118. Referring again to FIG. 4, another triangular relationship may be visualized by imagining three lines connecting the recesses 80, 82, 84 in triangular fashion as was done with the recesses 34, 36, 38. Furthermore, as with the star recesses 30, 32, 34, the three recesses 80, 82, 84 and their corresponding five mounds are not rotationally aligned. The array including the recess 82 and corresponding mounds 100, 102, 104, 106, 108 is shown rotated slightly more clockwise than are the arrays of recesses 80, 84, and their corresponding mounds; this relationship may be visualized by drawing imaginary lines between the recess 80 and the mound 90 and between the recess 84 and the mound 110, and comparing those lines with an imaginary line from the recess 82 to the mound 100.

Three reinforcing recesses 120, 122, 124 are also formed in the top surface 26 near the periphery to stiffen the tray.

The first group of star recesses 30, 32, 34 are configured to receive three chair bases of the type shown in FIGS. 1 and 2 in which the chair bases are disposed in a first or inverted position. The second group of cup-like recesses 80, 82, 84 and related groups of five mounds 90, 92, 94, 96, 98; 100, 102, 104, 106, 108; and 110, 112, 114, 116, 118 receive three chair bases in a second or upright disposition. The trays are formed of high density polyethylene having a nominal thickness of about 0.100 inches. The starting thickness of the polyethylene sheet, before forming, is about 0.187 inches. A resilient strip 126, FIG. 4, may be used in the spoke recesses, such as the recess 52, if further cushioning is desired for the inverted bases.

Figure 8:
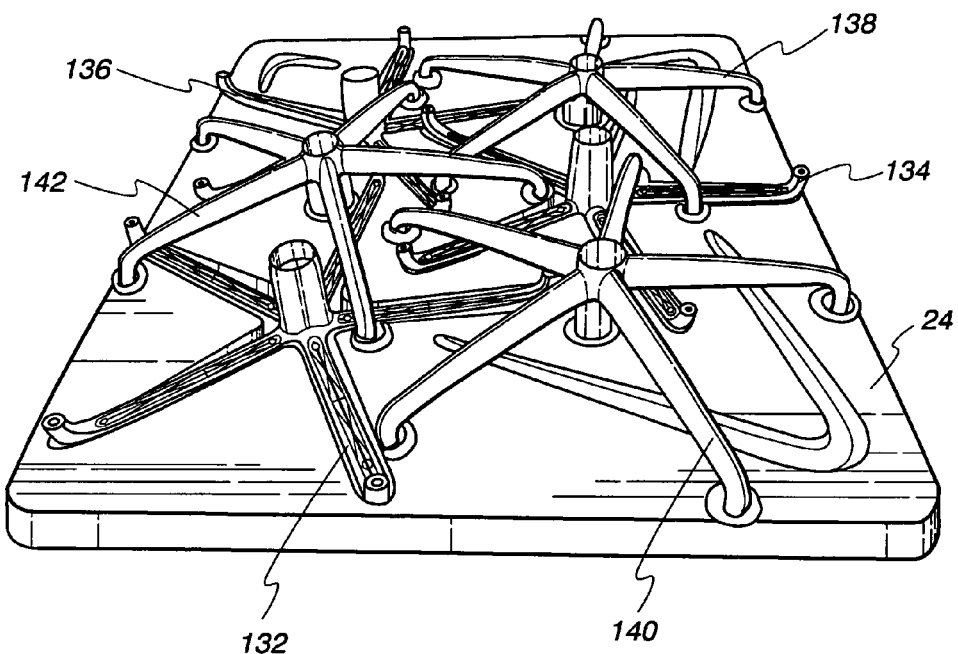
FIG. 8 is a downward looking isometric view of a tray on which is mounted six chair bases.

An example of a base loaded tray is illustrated in FIG. 8. Six mounted chair bases are shown, with three of the chair bases 132, 134, 136 being in an inverted position and three chair bases 138, 140, 142 being disposed upright in a position exactly opposite to the position of the first mentioned group of chair bases.

Figure 9:
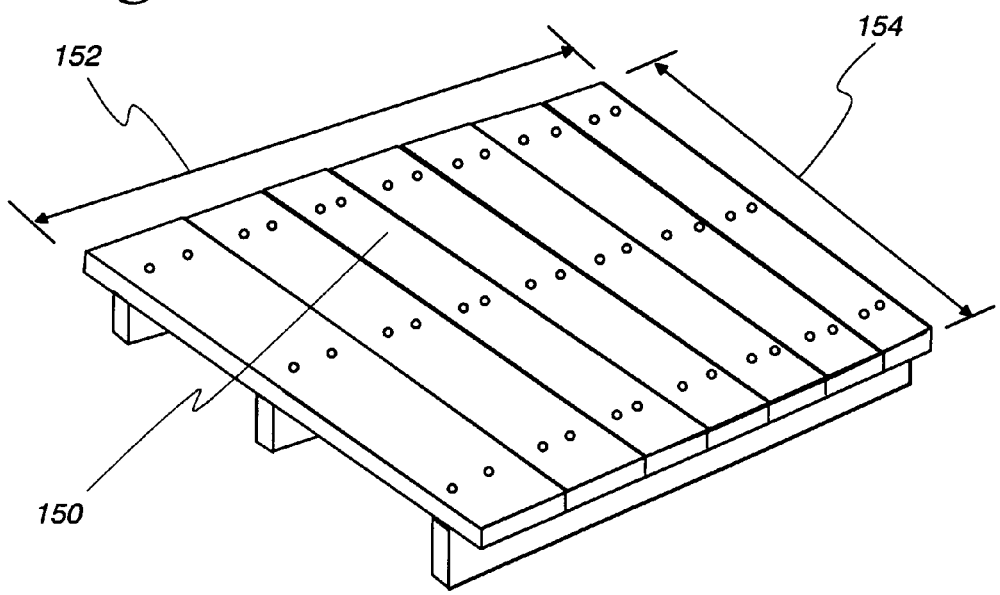
FIG. 9 is an isometric view of a standard pallet.

Illustrated in FIG. 9 is an example of a standard pallet 150 having a depth dimension represented by the line 152 of about forty-eight inches and a width dimension represented by the line 154 of about forth-two inches. For handling and shipping, the loaded trays are stacked to a height of about sixty-five to seventy-two inches or from between six to nine loaded trays.

The height of the stack is usually a function of ease of loading and unloading and the size of the truck used for transportation.

Figure 10:
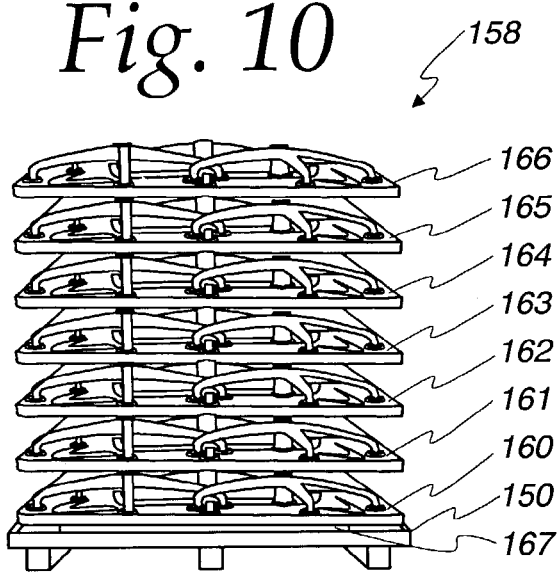
FIG. 10 is an elevation view of a stack of seven trays, each with six chair bases.

There is illustrated in FIG. 10, a stack of trays 158 including a bottom tray 160 connected to the pallet 150 and six additional loaded trays 161, 162, 163, 164, 165, 166. As can be seen, the trays are each aligned in the same orientation as are the chair bases. The bottom tray 160 may be attached by screws (not shown) to a length of two by four wood 167 which in turn is bolted (not shown) to the pallet. Each stacked tray (above the lowest tray) is supported by the hubs of the chair bases. In particular, the weight of each loaded tray is transmitted to the hubs of the chair bases of the tray below. When a chair base is inverted, the five legs or spokes are cradled by the five recesses of the supporting tray, such as the recesses 62, 64, 66, 68, 70, FIG. 4, and the bottoms of the hubs are captured by projections of the next higher tray, such as the projection 169, FIG. 5. With regard to the upright chair bases, the bottom portions of the hubs are captured in the cup-like recesses, such as recess 84, FIG. 4, and the top portions of the hubs are captured by projections of the next higher tray, such as projections 167, 168, FIG. 5. This supports the next tray and constrains the chair bases.

Figure 11:
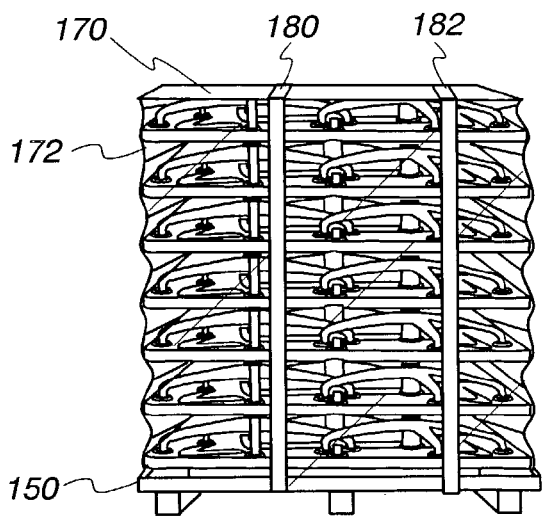
FIG. 11 is a stack of trays and bases as illustrated in FIG. 10 but with a plastic wrap, a layer of plywood and strapping bands.

The arrangement of a tray and six chair bases, three inverted, three upright, is repeated so that a stack of six to nine but more likely seven or eight layers of chair bases are arranged on a pallet as shown in FIG. 10. A plywood sheet 170, FIG. 11, may be placed across the top or uppermost layer of chair bases and then the stack may be shrink wrapped with a plastic film 172. Steel or plastic bands 180, 182, may also be used or may be used instead of a plastic wrap. Another pair of bands, not shown, may be placed perpendicular to the first mentioned bands 180, 182. A preferred arrangement is simply to wrap the stack with plastic only. The plywood and strapping bands may not be needed.

Figure 12:
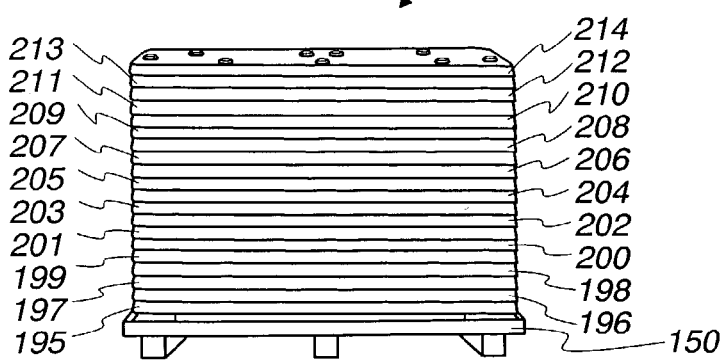
FIG. 12 is an elevation view of a stack of nested trays.

Reference is now made to FIG. 12 where there is illustrated a stack 190 of empty trays. After shipment of chair bases, the trays are returned for reuse. On the return trip the trays are nested one within another on top of the pallet 150 as shown. Because there are no longer layers of chair bases, as many as twenty trays 195, 196, 197, 198, 199, 200, 201, 202, 203, 204, 205, 206, 207, 208, 209, 210, 211, 212, 213, 214 may be stacked, banded and returned to the chair base casting company, for example, or to the paint and/or polishing company for reuse.

In operation a metal casting or a polisher or a paint company loads six chair bases on a single tray with three of the chair bases being inverted and three of the chair bases being upright as shown in FIG. 8. A tray attached to a pallet acts as a bottom layer of alternating trays and chair bases. After the bottom or lower most tray is loaded with bases, a second tray is positioned over the bottom tray and is loaded with bases. The trays are stacked so that the chair bases are sandwiches between two trays. Each of the trays are in exactly the same orientation or alignment so that the six chair bases are constrained, both by a lower tray to which the chair bases are mounted and by the next upper tray which also engages the same chair bases with its bottom surface. Each tray is positioned on top of six chair bases and loaded with its own six bases. This process continues until seven or eight alternating layers of trays and chair bases are formed. At seven or eight layers of chair bases the stacked trays and chair bases stand approximately between sixty-five to seventy-two inches from the bottom of the pallet to the uppermost tray. Thereafter, a plastic wrap is placed around the stack. A piece of plywood may be placed over the uppermost group of chair bases and metal or plastic strapping bands may also be used to securely fasten the stack together. After the stack is secured, the entire stack is in a stable condition and it may be moved by a fork lift truck to a vehicle for transporting the chair bases to a distant location. It is noted that already loaded trays may be stacked if desired.

The trays are constructed with a slanted peripheral skirt so as to nest one on top of another as shown in FIG. 12 after the chair bases have been unloaded. In this mode approximately twenty trays may be loaded on a pallet and banded for a return trip thereby allowing the trays to be reused for future shipments of chair bases. In this fashion a reliable and efficient packaging system is arranged which is also inexpensive because the trays, bands and pallets may used repeatedly.

The above specification describes in detail a preferred embodiment of the present invention. Other examples, embodiments, modifications and variations will, under both the literal claim language and the doctrine of equivalents, come within the scope of the invention defined by the appended claims. For example, more or less trays may be used in a stack, perhaps as a function of the vertical height of the chair base being transported; a plastic wrap may be used around the stack instead of bands or perhaps in addition thereto and it may be found that the upper plywood sheet can be dispensed with. These are all considered equivalent structures and will also come within the literal language of the claims as will other alternatives and many new technologies. There is no desire or intention here to limit in any way the application of the doctrine of equivalents nor to limit or restrict the scope of the invention.

What is claimed is:

1. A reusable packaging system for chair bases, each chair base having a hub and five legs, said system comprising:
   a plurality of trays, each tray having a central panel, said panel having a top surface with three sets of hubs and radiating recesses for receiving a first group of three chair bases, each chair base disposed in an inverted position, said top surface also having three sets of hub recesses and spaced mounds for receiving a second group of three chair bases, each chair base disposed in an upright position.

2. The system as claimed in claim 1 including:
   a pallet attached to one of said plurality of trays.

3. The system as claimed in claim 2 including:
   a stack of between six to nine trays, each tray mounting six chair bases, said trays being oriented in the same manner in the stack; and including
   a material to wrap said stack.

* * * * *